P. H. INMAN,
Assignor of one-half to C. B. SOULE.
STEAM HEATING APPARATUS.
No. 10,721. Reissued May 11, 1886.
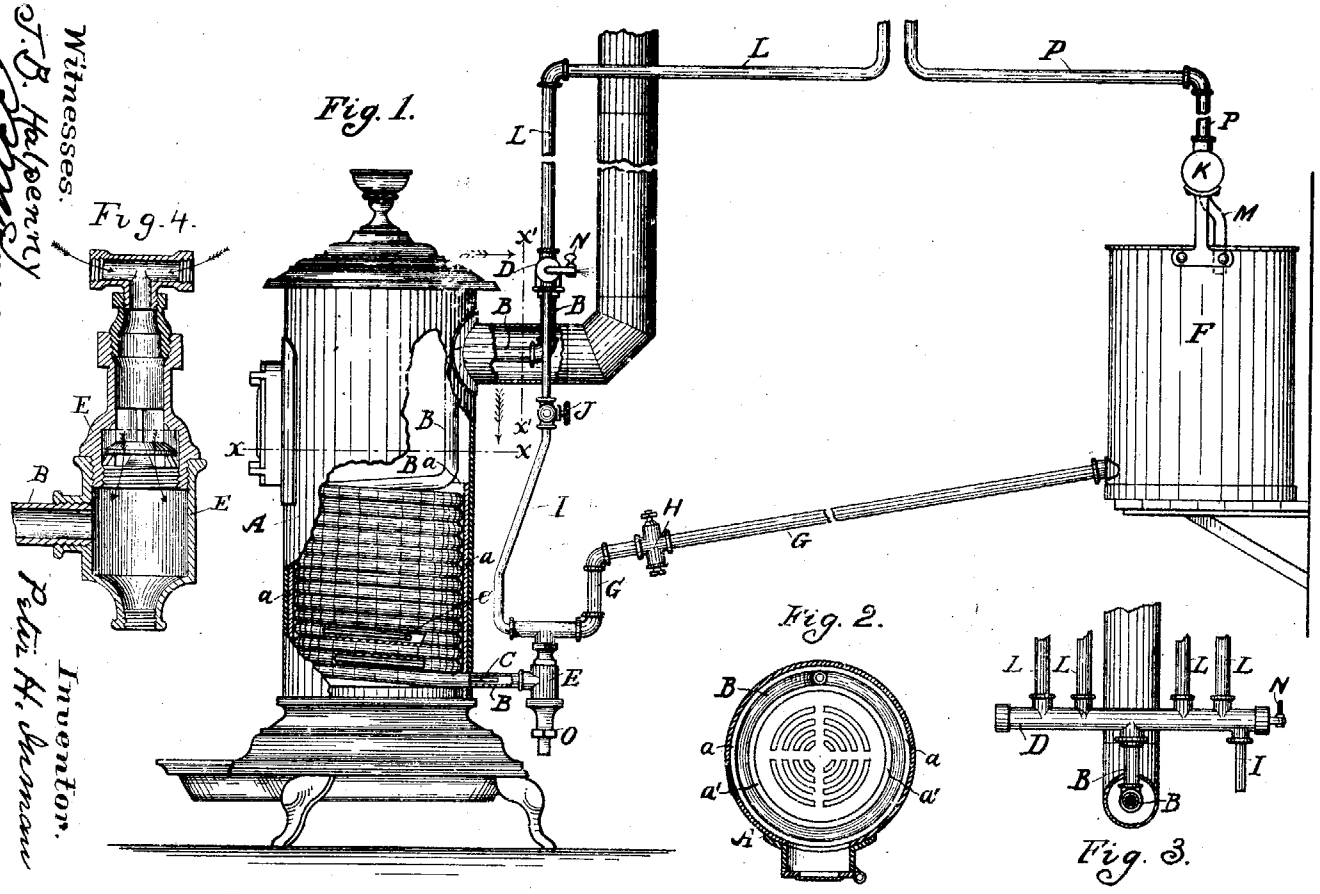
Witnesses.
T. B. Halpenny
R. B. Morse
Inventor.
Peter H. Inman
By F. F. Warner
his atty.

UNITED STATES PATENT OFFICE.

PETER H. INMAN, OF HIGHLAND PARK, ILLINOIS, ASSIGNOR OF ONE-HALF TO CHARLES B. SOULE, OF SAME PLACE.

STEAM-HEATING APPARATUS.

SPECIFICATION forming part of Reissued Letters Patent No. 10,721, dated May 11, 1886.

Original No. 309,625, dated December 23, 1884. Application for reissue filed January 19, 1885. Serial No. 153,310.

*To all whom it may concern:*

Be it known that I, PETER H. INMAN, residing at Highland Park, in the county of Lake and State of Illinois, have invented certain new and useful Improvements in Steam-Heating Apparatus, of which the following, in connection with the accompanying drawings, is a specification.

In the drawings, Figure 1 is a side elevation of a steam-heating apparatus embodying my improvements. Fig. 2 is a section in the plane of the line *x x* of Fig. 1, viewed in the direction indicated by the arrow there shown. Fig. 3 is a section in the plane of the line *x' x'*, viewed in the direction indicated by the arrow there shown; and Fig. 4 is a vertical central section through the lower check-valve.

Like letters of reference indicate like parts.

A represents an ordinary cylinder heating-stove.

B is a coil of pipe of comparatively large diameter, located within the stove in the place usually occupied by fire-bricks; but fire-bricks may also be employed, if their use be deemed best; but I regard it as preferable to employ a cast-iron cylinder in the place of fire-bricks, so as to expose the coil more directly to the incandescent fuel, and yet protect it somewhat from the fire; and I also deem it best to place a sheet-iron cylinder around the outside of the coil, as shown at *a* and *a'*, respectively.

C is a smaller coil, arranged within the lower part of the coil B. The coil C is of such diameter as not entirely to fill that part of the coil B in which it is arranged, and is open at both ends.

D is a horizontal pipe located outside of the stove, and entered by the upper end of the pipe B.

E is a check-valve, entered by the lower end of the pipe B. The valve E may be made in any well-known or suitable way adapting it to prevent the steam from forcing the hot water in the pipe B back through the said valve, and permitting it to open automatically when the steam-pressure is comparatively low or weak, or at its minimum.

F is an open water-tank, and G is a pipe passing from the said tank into the upper part of the valve E.

H is a stop-cock located in the pipe G, and between the valve E and the tank F.

I is a drip and equalizer pipe entering the pipe D and the upper part of the valve E.

J is a shut-off in the pipe I.

K is a condenser, and L L are pipes passing from the pipe D to the radiator-coils located in the different rooms, respectively.

M is a drip-pipe passing from the condenser into the upper or open end of the tank F.

N is a safety-valve, and O is a tap or drip at the lower end of the valve E. A drip-pipe, P, passes down from the coil in each room, respectively, into the condenser.

The operation is as follows: I fill or nearly fill the tank F with water, and set the valve or cock H so as to permit the required amount of water to pass through the pipe G and valve E into the coils B and C. When the pressure below the valve E exceeds that above it, that valve will thereby be automatically closed, and so temporarily shut off the supply of water to the said coils. However, when the pressure above the valve E exceeds that below it, that valve will thereby be automatically opened, and a due amount of water again supplied to the coils. The steam-pressure, as will be perceived, is liable to variation, and this variation I utilize, through the instrumentality of the means described, for feeding the water automatically into the heater, as occasion requires. The drip and pressure-equalizing pipe I aids very materially in the accomplishment of this result by furnishing steam-pressure, which enters the valve-shell at a point above the valve E, and equalizes the pressure so as to permit that valve to open and close at the proper time without noise. It is to be understood that the fire should be so regulated and the tank F of such elevation that the water will be generated into steam before leaving the coiled portion of the pipe B, and that if any water should be carried to the pipe D it will be drained therefrom into the pipe I, and thence into the valve E and coils B and C, when the pressure on top of the valve E exceeds the pressure below it; but any pressure exerted above the said valve through the pipe I may be prevented by closing the cock J. The steam thus generated will pass to the radiator-coils for heating the rooms, and the drip or condensation in those coils may be allowed to pass down through the pipes P P into the condenser K, and thence into the tank F. The valve N prevents danger from too great steam-pressure. The coils B and C may be drained or emptied by opening the drip or tap O. The open small coil C holds a portion of the water away from as direct heating by the fuel as the water in coil B is exposed to, and thus modifies, to some extent, the temperature of the water in the pipe B, and tends to prevent too sudden or rapid evaporation. The water in the pipe C, however, eventually passes into the pipe B, becomes steam, and the smaller pipe is again filled, as well as the pipe B.

This apparatus may also be used as a water-heater by permitting the water to enter the coils faster than it can be generated into steam, and the water so heated may be conducted away from the heater for use.

Having thus described my invention, what I claim as new, and desire to secure by Letters Patent, is—

1. The combination, substantially as specified, in a steam-heating apparatus, of the coil B, located in the heater and in communication with the steam-distributing pipes and heat-radiators, the water-supply pipe G, the stop-cock H, located in the pipe G, and the automatic valve E, also located in the pipe G and communicating with the pipe B, and arranged between the latter pipe and the cock H, for the purposes specified.

2. The combination, substantially as described, in a steam-heating apparatus, of the coil B, located in the heater and in communication with the steam-distributing pipes and heat-radiators, the water-supply pipe G, the stop-cock H, located in the pipe G, the automatic valve E, also located in the pipe G and in communication with the pipe B, and arranged between the latter pipe and the valve or cock H, and the drip-pipe I, entering the steam-distributing pipe, and also entering the valve E, and having therein a shut-off or cock, J, for the purposes set forth.

3. The combination, with a heater, its contained water-heating pipe, water-inlet pipe, and steam-discharge pipe, of a check-valve in the water-inlet pipe and a drip-pipe communicating with the steam-discharge pipe at the point of its emergence from the heater at one end and with the check-valve at the other, whereby the operation of the valve is aided, substantially as described.

PETER H. INMAN.

Witnesses:
F. F. WARNER,
M. BYRON RICH.